Nov. 28, 1967 — R. W. CATZEN — 3,355,324
METHOD OF CLEANING INK FROM RUBBER DIES
Filed Jan. 24, 1964

Robert W. Catzen
INVENTOR by Jacobi & Davidson
ATTORNEYS 3,355,324
METHOD OF CLEANING INK FROM RUBBER DIES
Robert William Catzen, Pikesville, Md., assignor to Covington Manufacturing Corporation, Baltimore, Md., a corporation of Maryland
Filed Jan. 24, 1964, Ser. No. 339,975
11 Claims. (Cl. 134—29)

ABSTRACT OF THE DISCLOSURE

A method of cleaning and removing ink from rubber printing dies without the need for mechanical scrubbing or brushes, wherein the printing dies are subjected first to an intermittent washing spray containing a cleaning solution preferably including a sodium silicate, then to an intermittent rinsing spray of water, and finally to an intermittent drying air blast.

---

This invention relates to the cleaning of rubber dies, and is particularly concerned with the provision of an efficient method of cleaning rubber dies which permits rapid removal of printing ink therefrom, and if desired, through the use of automatic apparatus.

It is common practice in plants where rubber printing dies are used to clean the dies by hand-scrubbing operations. Following such operation, in the normal instance, so-called "picks" are used to remove remaining ink deposits. This type of approach to cleaning rubber dies, while in wide-spread use, presents severe disadvantages both from the labor standpoint and from the standpoint of prolonging the useful life of the dies. In particular, substantial time is required for the scrubbing operation thus increasing labor costs. Moreover, because of the type of scrubbing operations used and because of the necessity of "picking" the dies clean, the dies are at least partially eroded and/or deteriorated.

While automation has tended to replace manual operations in a substantial number of fields, automation has not become wide-spread in the field of cleaning rubber printing dies, notwithstanding the substantial number of dies which are handled and used by many different types of companies, including particularly companies which manufacture or process containers according to mass production techniques. Specifically, while spraying type washing and rinsing operations lend themselves to normal automatic cleaning techniques, mere washing and rinsing of rubber printing dies does not produce the requisite cleaning.

Notwithstanding the above, the present invention is directed to a method of cleaning rubber printing dies, which method lends itself to use with automatic apparatus providing a spray rinsing and washing, and which through an effective combination of sequential operations performed under particular conditions, permits one to rapidly and effectively clean rubber printing dies. More specifically it is a primary object of the present invention to provide a method of cleaning rubber printing dies by utilizing spray type washing, rinsing and drying operations which are carried out under prescribed conditions and with the use of prescribed fluids to achieve rapid and effective cleaning of rubber printing dies and efficient removal of inks which may have been impregnated in such dies during use.

Consistent with the preceding basic and elementary object of the present invention, there are certain further objects hereof including the following:

(a) the provision of such a method wherein the basic sequential steps performed include a spray washing, a spray rinsing, and a spray drying with the spray washing being carried out through the use of an effective prescribed type of cleaning composition, with the spray rinsing being carried out with the use of a common inexpensive liquid such as water, and with the spray drying being carried out with the use of a common inexpensive gas such as air;

(b) the provision of such a method wherein the respective washing, rinsing and drying operations are carried out in a correlated sequence with correlated timing of the respective steps, and yet intermittingly subjecting the dies being cleaned to respective fluid and gas streams;

(c) the provision of such a method which utilizes a particular type of washing solution incorporating an active cleansing ingredient which is effective to clean the dies, and further incorporating a wetting agent to facilitate the cleaning operation, and a humectant which subordinates any tendency of the active ingredient to physically irritate an operator upon contact;

(d) the provision of such a method which combines temperatures and pressures used in performing the steps thereof in a correlated manner with the solutions and particular spray operations so as to impart an overall rubber die cleaning operation; and (e) the provision of such method which can be carried out efficiently with automatic apparatus and in such a manner as to minimize costs of recirculation techniques.

The invention resides in a particular sequence of steps, in the manner in which such steps are performed, and in the particular types of fluids, whether liquid or gas, handled in accordance with each step. The invention will be better understood and objects other than those specifically set forth above will become apparent, when consideration is given to the following detailed description. Such description makes reference to the annexed drawings presenting preferred and illustrative embodiments of the invention.

Figure 1:
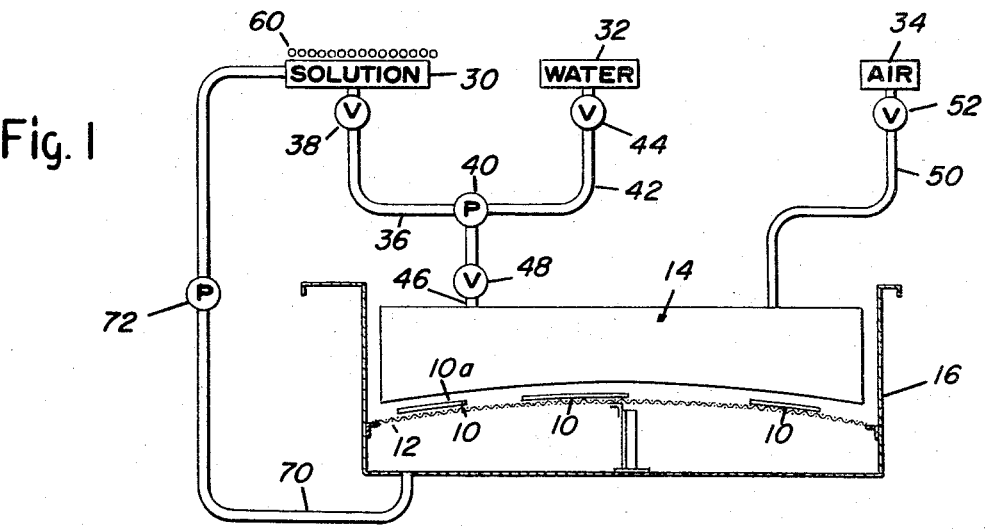
FIGURE 1, is a schematic end view of an arrangement which can be used in accordance with the present invention to carry out the method hereof.

In accordance with the invention, rubber printing dies, such as the dies designated by the reference numeral 10 in FIGURE 1, are supported on one side of an arcuate foraminous surface such as the screen 12 in FIGURE 1. The screen 12 is supported within and above the lowest level of a tank 16. The screen and the tank can be of conventional construction but the arcuate supporting surable sources of water and air respectively. The air source of some type of tank is important because this permits the collection of solution to which the dies are subjected to in the manner explained more fully below.

As indicated above, the method hereof provides for subjecting the dies to spray washing and rinsing operations and to drying operations. To this end, the arrangement shown in FIGURE 1, includes a header 14. This header is mounted, by any suitable means, for movement longitudinally over the screen 12 lengthwise of the tank 16. The direction of movement of the header is indicated by the arrow 13 shown in FIGURE 2, and it will be noted that the same, in any given position thereof, is located over only a portion of the arcuate screen 12.

Figure 2:
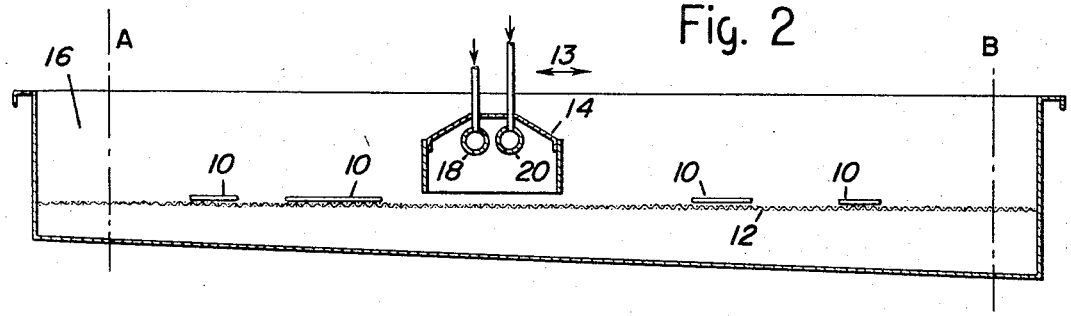
FIGURE 2, is a schematic side view of the tank and header portion of the arrangement shown in FIGURE 1.
Figure 3:
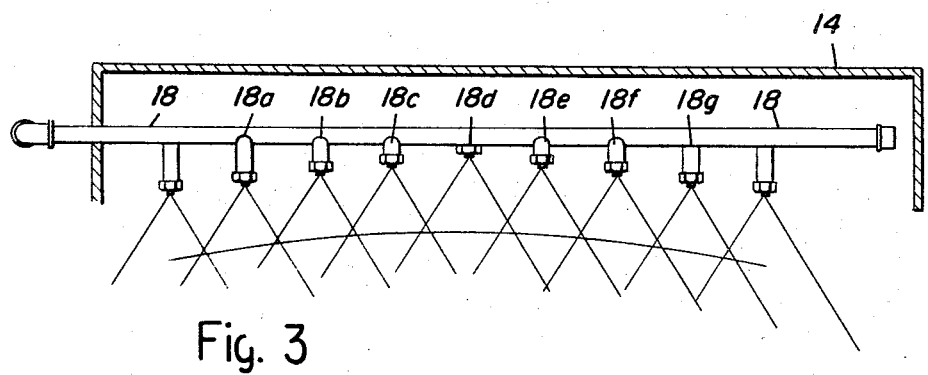
FIGURE 3 is a fragmental sectional view of a header and die support such as can be incorporated in the arrangement of FIGURES 1 and 2.

As shown in FIGURES 2 and 3, the header 14 carries a first plurality of spray heads 18 and a second plurality of air jet heads 20. Since the header is movable longitudinally of the tank 16, as indicated, and since first and second groups of spray heads 18 and 20 are incorporated, the arrangement described is adapted to be operated consistent with the method hereof so as to subject the rubber printing dies 10, or specifically the printing face thereof, to liquid and air spraying operations.

With the method of the invention, the printing faces of the dies are to be subjected intermittently to liquid spraying operations and to an air drying operation. Accordingly, in carrying out the invention with the arrangement such as shown in FIGURE 1, the header 14 would be reciprocally moved between opposite extremes over the bank, during performance of the method. In other words, as shown in FIGURE 2, the header 14 would move first to one extreme, i.e., in line with the axis designated as A, and would then move to the other extreme, i.e., in line with the axis designated by B. The header would then return to the axis designated as A for example, and would then return to the axis designated as B. In this manner, the header 14 would move back and forth over the printing dies to be cleaned. The particular mechanism incorporated for moving the header, and the particular manner in which the same is supported can be varied. The important factor is to understand that by virtue of the movement of the header 14, the rubber dies are intermittently subjected to fluids, whether liquids or gases, issuing from the spray or jet heads, as the case may be, carried by the reciprocating header.

Preferably, the header is automatically operated at a uniform speed. However, the movement can be achieved manually, and in fact, the method hereof can be carried out manually if desired.

By again referring to FIGURE 1, it will be seen that three tanks generally designated by the numerals 30, 32 and 34 are presented. The tank 30 represents a tank in which a washing solution is contained. On the other hand, the tank 32 and the tank 34 merely illustrate suitable sources of water and air respectively. The air source 34 contains air under a pressure of between 80 and 120 p.s.i.g. The water source, on the other hand, need be under no greater pressure than that which is experienced at a common outlet, such as the spout of a sink, such pressure being between 60 and 100 p.s.i.g. and preferably between 70 and 90 p.s.i.g.

The respective solution, water and air sources are coupled to the header 14. Specifically, as illustratively shown in FIGURE 1, a line 36 having a valve 38 therein leads from the solution source 30 to a pump 40. A line 42 having a valve 44 therein similarly leads from the water source 32 to the pump 40. The pump 40 in turn feeds, via a line 46 having a valve 48 therein, to the group of spray head 18 mounted on the header 14. In contrast, the air source 34 is connected through a line 50 having a valve 52 therein to the air jet heads 20.

The solution source 30 contains a solution of water and a cleaning composition dissolved therein. It has been found that the most advantageous results can be obtained when the cleaning solution has as its major active ingredient a sodium silicate. The cleaning solution also contains a sodium phosphate and a non-ionic wetting agent. Sodium metasilicate has been found to be the preferred predominant ingredient of the cleaning composition. The sodium phosphate can well comprise sodium tri-polyphosphate sodium hexametaphosphate, tri-sodium phosphate or disodium phosphate. Various non-ionic surface active agents can be used, such as for example, nonyl polyethylene glycol ether containing 10 moles of ethylene oxide.

Best results have been achieved when the cleaning composition contains 55–65% by weight of anhydrous sodium metasilicate, 30–40% by weight of anhydrous disodium phosphate and 5% of a non-ionic surface agent.

The cleaning composition referred to above works with complete satisfaction when dissolved in water with the concentration which results from a ratio of between 2 and 8 ounces by weight of the composition to between ½ and 2 gallons (preferably 1 gallon) by volume of the water. Preferably the ratio should be maintained at about 6 ounces by weight of the composition to 1 gallon by volume of the water. The ratio of composition weight to water volume can be varied within the noted ranges depending upon the type of ink with which the dies are impregnated, the type of cleaning which has previously been used on the dies, and like factors. In any event, however, the cleaning solution would contain a minor part by volume of the cleaning composition.

Now, bearing in mind the type of cleaning composition used, the first step of the actual cleaning operation can be considered in more detail. By again referring to FIGURE 1, it will be noted that a heating unit generally designated by the numeral 60 is disposed adjacent the solution tank 30. This heating unit is incorporated so as to maintain the solution at a temperature of between 150° and 200° F., but preferably between 170° and 180° F. When the solution is formulated as prescribed above, and heated to a temperature within the stated ranges, then the arrangement is ready for the initial operation. To this end, the valve 38, for example, would be opened and the solution would be supplied through the line 36 and via the pump 40 through the valve 48 and line 46 to the spray heads 18. The configuration of the spray heads and the capacity of the pump should be such that the solution is delivered on the face of the die under a pressure between 50 and 110 p.s.i.g., but preferably between 70 and 90 p.s.i.g.

Now, it is to be remembered that as the solution is delivered to the spray heads 18, the header 14 is being moved back and forth in the tank 16 and over the respective printing dies 10. By virtue of such operation, the printing faces of the dies are intermittently subjected to a spraying operation with the solution comprising water having a sodium silicate dispersed therein as the major active ingredient thereof and with the solution having a temperature range of between 150 and 200 degrees F., but preferably between 170 and 180 degrees F.

This spraying operation referred to immediately above is carried out such that the face of each die is subjected to the spray itself for a fractional amount of the total spraying operation time. Since the spray heads 18 are moving back and forth over the printing surfaces of the dies, each die will receive an intermittent spray, varying in time relation to the length of travel of the header 14 and the placement of the die on the foraminous surface 12. This intermittent action with the particular cleaning composition utilized has been found to be the most satisfactory.

During this initial stage, the solution to which the dies have been subjected drains therefrom by virtue of the arcuate supporting thereof, and travels through the screen 12 into the base of the tank 16. This solution is then directed as by the line 70 to a circulating means 72 which returns the solution either to the solution source 30, as shown, or alternately to the line 36 for re-circulation, through the header and the spray heads 18 therein.

Consistent herewith, the printing faces of the dies are to be subjected to the cleaning solution, and the rinse solution referred to below with substantially uniform pressure existing across the face of the die and with the dies being entirely covered. Accordingly, as shown in FIGURE 3, the spray heads 18a–18f are so disposed as to create a plurality of spray streams which have overlapping edge portions at the level of the printing faces of the dies. It has been found particularly satisfactory where the spray spread is of the order of 65°, wherein the lateral dimensional spread of the spray at the face of the dies is between 4 and 5 inches, and wherein the overlap is between ¾ and 1 inch.

To achieve the uniform spray treatment, the respective spray heads 18a–18f are disposed with their outlets along an arcuate path which extends parallel to the arcuate contour of the screen 12. In other words, the sprays issue in parallel relation to one another but with respective streams issuing from points along an arcuate path extending parallel to the arcuate path of the foraminous supporting surface.

After the first step of the operation described above has been completed, then the printing dies are subjected to a rinsing operation. For this purpose, the valve 38 would be closed and the valve 44 open, whereupon the pump 40 would transfer water to the same spray heads 18. The rinse water is drained overboard from tank 16 during this time and also the header 14 is moving back and forth as described above so that the dies are intermittently subjected on the printing face thereof to a spraying operation with water under a pressure of between 60 and 100 p.s.i.g., and preferably under a pressure of between 70 and 90 p.s.i.g. The rinsing operation is repeated for a time which is substantially shorter than the washing operation, i.e., for a period wherein the total exposure of each portion of a printing die to a rinsing spray is also a fractional part of the total rinsing operation time, with the operation being intermittent as described. In any event, the period of time required for the rinse is no greater than one half of the time required for the washing operation.

Following the completion of the washing operation, the valve 48 would be closed and the valve 52 opened so that air under pressure is directed via the line 50 to the air jet heads 20. These heads 20 are disposed in the same fashion as the spray heads 18a–18f, but the jet heads 20 serve to direct air streams onto the printing faces of the dies supported on the arcuate foraminous surface or screen 12. The air is delivered from the source 34 under a pressure of between 60 and 120 p.s.i.g. so that the actual pressure of the air encountered by the face of the printing die is between 80 p.s.i.g. and 100 p.s.i.g. The air streams serve to dry the printing dies and again, this operation is carried out intermittently in the same manner that the washing and rinsing operations are performed. The drying operation should be extended for a period such that each portion of a printing die is subjected to a drying stream for a fractional part of the total drying operation time. In any event, here again, the total time required for the drying operation does not exceed one half of the total time required for the washing operation.

The above described procedure is applicable where dies have at least once been treated in accordance with the method hereof, and/or in cases where the dies are being washed for the first time. If dies are utilized which have not previously been washed, then it has been found desirable to initially spread the cleaning composition, in dry condition, over the dies and to wet the dies at least slightly with water. The cleaning composition tends to dislodge the ink which has become imbedded in the dies, so that once the method hereof has started, it can proceed as prescribed. In other words, with older dies that have not been treated in accordance with the method hereof, an initial dislodging time may be required.

After reading the foregoing detail description of illustrative and preferred embodiments hereof, it should be appreciated that the objects set forth at the outset of the present specification have been successfully achieved.

Accordingly, what is claimed is:

1. A method of cleaning and removing ink from rubber printing dies without the need for mechanical scrubbing or brushes, said method comprising the steps of:
   (a) supporting the dies with the printing faces thereof directed upwardly, on an arcuate foraminous surface;
   (b) intermittently subjecting the printing faces on the dies to a spray of sodium silicate cleaning solution for a first given period of time of sufficient length such that said dies are cleaned and effectively free of ink when subjected to steps (c) and (d);
   (c) then for a second given period of time less than said first given period of time, intermittently subjecting the printing faces on the dies to a water spray;
   (d) then for a third given period of time less than said first given period of time, intermittently subjecting the printing faces on the dies to an air blast.

2. The method of claim 1 wherein said spray operations of steps (b), (c) and (d) are performed by creating a plurality of spray streams having overlapping edge portions at the level of the printing faces on the dies.

3. The method of claim 1 wherein said cleaning solution consists of water having a sodium silicate dispersed therein as the major active ingredient thereof.

4. The method of claim 3 wherein said cleaning composition further includes a sodium phosphate and a non-ionic wetting agent, said sodium phosphate and said non-ionic wetting agent being present in minor amounts by weight compared to said sodium silicate.

5. The method of claim 4 wherein said sodium phosphate is selected from the group consisting of sodium tri-polyphosphate and sodium hexametaphosphate.

6. The method of claim 5 wherein said sodium silicate is sodium metasilicate.

7. The method of claim 4 wherein said cleaning composition consists of about 79% by weight of sodium silicate, 16% by weight of sodium tri-polyphosphate, and 5% by weight of said non-ionic wetting agent.

8. A method of cleaning and removing ink from rubber printing dies without the need for mechanical scrubbing or brushes, said method comprising the steps of:
   (a) intermittently subjecting the printing faces on the dies to a spray of cleaning solution comprising water having a sodium silicate dispersed therein as the major active ingredient thereof for a first given period of time of sufficient length such that said dies are cleaned and effectively free of ink when subjected to steps (b) and (c), said cleaning solution being under a pressure of between 60 and 100 p.s.i.g. and having a temperature of between 150° and 200° F.;
   (b) then for a second given period of time less than said first given period of time, intermittently subjecting the printing surfaces on the dies to a water spray having an ambient temperature;
   (c) then for a third given period of time less than said first given period of time, intermittently subjecting the printing surfaces on the dies to an air blast under a source pressure of between 60 and 120 p.s.i.g. and a pressure at the printing surface of the dies of between 80 and 100 p.s.i.g.

9. The method of claim 8 wherein the temperature of the cleaning solution is between 170° and 180° F.

10. The method of claim 8 wherein the cleaning solution is under a pressure of between 70 and 90 p.s.i.g.

11. A method of cleaning and removing ink from rubber printing dies without the need for mechanical scrubbing or brushes, said method comprising the steps of:
   (a) intermittently subjecting the printing surfaces on said dies to a spray of cleaning solution comprising water and a cleaning composition dispersed therein for a first given period of time of sufficient length such that said dies are cleaned and effectively free from ink when subjected to steps (b) and (c), said cleaning solution consisting of between 2 and 10 ounces of cleaning composition by weight for between ½ and 2 gallons of water by volume;

(b) then for a second given period of time less than said first given period of time, intermittently subjecting the printing surfaces on the dies to a water spray having an ambient temperature and under a pressure of between 60 and 100 p.s.i.g.;

(c) then for a third given period of time less than said first given period of time, intermittently subjecting the printing surfaces on said dies to an air blast under a pressure of between 60 and 120 p.s.i.g.

References Cited

UNITED STATES PATENTS

| | | | |
|---|---|---|---|
| 1,142,083 | 6/1915 | Dodge | 134—102 |
| 1,997,849 | 4/1935 | Bargar | 134—172 |
| 2,351,342 | 6/1944 | Karlstrom | 134—172 |
| 3,231,506 | 1/1966 | Schulerud | 252—135 |

JOSEPH SCOVRONEK, *Primary Examiner.*

MORRIS O. WOLK, *Examiner.*

G. R. MYERS, *Assistant Examiner.*